United States Patent [19]

Arendt

[11] 4,233,282

[45] Nov. 11, 1980

[54] MOLTEN SALT SYNTHESIS OF BARIUM AND/OR STRONTIUM TITANATE POWDER

[75] Inventor: Ronald H. Arendt, Schenectady, N.Y.

[73] Assignee: General Electric Company, Schenectady, N.Y.

[21] Appl. No.: 85,924

[22] Filed: Oct. 18, 1979

[51] Int. Cl.$^3$ ............................................. C01G 23/00
[52] U.S. Cl. .................................. 423/598; 252/62.9; 423/DIG. 12; 423/593
[58] Field of Search ............... 423/593, 598, DIG. 12; 252/62.9

[56] References Cited

U.S. PATENT DOCUMENTS

| | | | |
|---|---|---|---|
| 2,985,506 | 5/1961 | Di Vita et al. | 423/598 |
| 2,992,079 | 7/1961 | Linares et al. | 423/598 |
| 3,002,861 | 10/1961 | Suchoff | 423/598 |
| 3,065,049 | 11/1962 | Bundy | 423/598 |
| 3,330,697 | 7/1967 | Pechini | 423/593 |
| 3,793,443 | 2/1974 | Arendt | 423/594 |
| 4,041,143 | 8/1977 | Fujiki et al. | 423/598 |
| 4,152,280 | 5/1979 | Arendt et al. | 252/62.9 |
| 4,152,281 | 5/1979 | Arendt et al. | 252/62.9 |

FOREIGN PATENT DOCUMENTS 2433279  9/1975  Fed. Rep. of Germany ........... 423/598

OTHER PUBLICATIONS

Motojuma et al., "Journal of Nuclear Sci. & Technology", vol. 10, Nov. 1973, pp. 685–688.
Yanagida et al., "J. Ceramic Soc., Japan", vol. 75, 1967, pp. 349–351.

*Primary Examiner*—Herbert T. Carter
*Attorney, Agent, or Firm*—Jane M. Binkowski; James C. Davis, Jr.; Leo I. MaLossi

[57] ABSTRACT

A particulate mixture of an alkali chloride solvent salt, titanium oxide and an alkaline earth reactant selected from the group consisting of barium oxide, strontium oxide, and mixtures thereof, is heated to melt the chloride salt solvent in which the titanium oxide and alkaline earth reactant dissolve and react precipitating a titanate selected from the group consisting of barium titanate, strontium titanate and mixtures thereof.

6 Claims, No Drawings crystals present in the resulting alkaline earth titanate powder increases correspondingly, and with an amount of chloride salt or salt mixture above about 50% by weight, substantially all or all of the product powder recovered consists essentially of individual grains or crystallites.

The reactants or precursors therefor and the alkali chloride salt solvent are admixed to produce a substantially thorough mixture to insure good contact and complete reaction. The actual mixing operation can be carried out in several ways which do not introduce undesirable impurities into the resulting product. Preferably, water at room or ambient temperature is admixed with the reactant oxides or precursors therefor and the chloride salt solvent in an amount which, with stirring, is at least sufficient to form a slurry. The wet mixing can be carried out, for example, using a plastic milling medium or by wet mixing in a high speed blendor with preferably distilled or deionized water, depending on the application of the resulting product and preferably, with stainless steel or plastic stirrers, for example a propeller, in a stainless steel or plastic, preferably Teflon, lined vessel.

The particular reaction temperature used depends largely on the chloride salt used and the reaction rate desired, i.e. rate of precipitation of alkaline earth titanate desired. Generally, the higher the reaction temperature, the faster is the reaction rate. In molten form, the present chloride salt is a solvent for the reactant oxides, and the minimum reaction temperature is the temperature at which the chloride salt or salt mixture melts and for sodium chloride alone the melting point or liquidus temperature is about 1073K(800° C.) whereas for potassium chloride alone it is about 1063K(790° C.). All mixtures of sodium chloride and potassium chloride form a mixture which melts at a temperature below the melting point of sodium chloride alone and thus, for the eutectic mixture of 50 mole % potassium chloride $-50$ mole % sodium chloride the minimum reaction temperature is 931K(658° C.). Preferably, in the present invention, the minimum reaction temperature is at least about 10K above the melting point, i.e. liquidus temperature of the chloride salt or salt mixture since such a temperature insures complete melting of chloride salt and also increases the fluidity of the molten salt producing increased wetting of the reaction mixture. However, the maximum reaction temperature is always below the melting point of the alkaline earth titanate being precipitated, which for $SrTiO_3$ is about 2311K(2038° C.) and for $BaTiO_3$ is about 1889K (1616° C.) and should be kept below the temperature at which the chloride salt vaporizes significantly. Particularly preferred is a reaction temperature ranging from about 1073K(800° C.) to about 1373K(1100° C.) since it is not difficult to maintain and provides high reaction rates without significant vaporization of the molten salt solvent.

At reaction temperature the chloride salt melts and the reactant oxides dissolve and react in the molten salt precipitating the alkaline earth titanate. The reaction temperature is maintained until the reaction is completed. The particular period of reaction time depends largely on reaction temperature as well as the amount of chloride salt used and is determinable empirically. When the reaction is completed, the reacted mass is cooled at any convenient rate, preferably in air and preferably to about room temperature.

The cooled alkaline earth titanate-containing reacted mass is a solid, fired cake comprised of alkaline earth titanate particles distributed throughout a matrix of solidified chloride salt. Specifically, the alkaline earth titanate, which is maintained as distinct second phase crystallites, is present as fine crystallites embedded in the molten salt matrix. After reaction at elevated temperature, the cooled, solidified cake is disintegrated with water to yield the alkaline earth titanate crystallites and an aqueous solution of the chloride salt. More specifically, water, preferably distilled or deionized to prevent introduction of impurities and preferably at room temperature, is added to the solid reacted mass in an amount at least sufficient to dissolve away the chloride salt content therefrom. The solubility of the present chloride salt is about 0.3 kilogram per liter of water at room temperature. This dissolution preferably is carried out in a plastic vessel, and as a practical matter with mixing to substantially shorten dissolution time, using, for example, a motor driven plastic or stainless steel stirrer. As the chloride salt dissolves, the solid mass disintegrates leaving a fine alkaline earth titanate powder that contains no perceptibly agglomerated material, i.e. perceptible to the eye. The alkaline earth titanate powder is then collected, washed and dried.

The alkaline earth titanate powder can be recovered from the aqueous supernatant chloride solution by a number of techniques. For example, the alkaline earth titanate powder can be recovered by decanting the supernatant solution and drying the alkaline earth titanate in air. The particular recovery technique depends on the impurities which may be present and on the purity required in the ceramic or other product fabricated from the powder. Preferably, the resulting slurry is mixed at room temperature in air for about 20 minutes. Mixing is then discontinued and a flocculating agent which is organic and soluble in water, preferably an anionic flocculant, is added in an amount which is sufficient to flocculate and settle the alkaline earth titanate powder. After several washings and settlings, the wet powder is dried. Preferably, the flocculating agent is added in aqueous solution, about 0.1 gram of flocculant per 100 grams of water usually being satisfactory, and preferably the flocculating agent is used only in an amount necessary to settle the powder. For production of an alkali earth titanate powder of high purity, the flocculating agent should be completely removable by heating the powder in air at temperatures below the melting point of the powder and preferably not higher than about 1073K(800° C.). Preferably, to remove any remaining water and flocculant, it is heated at about 773K(500° C.) for about 20 minutes.

Alternatively, in the present process, if desired, a particulate inorganic precursor of the reactant oxides can be used. The precursor should decompose completely to form the oxide and by-product gas or gases leaving no contaminants in the reacted mass. Representatives of the precursors of the reactant oxides useful in the present process are the carbonates, hydroxides and nitrates. The precursor should be used in an amount sufficient to produce the respective oxide in at least stoichiometric amount.

The present alkaline earth titanate powders are off-white in color. The alkaline earth titanate poders are free-flowing and can be in the form of aggregates or in the form of individual powder crystals, but usually it is a mixture of both. The aggregates which range in size from about 1 micron to about 20 microns, are particles consisting essentially of a cluster of smaller sized crystals weakly bonded together autogeneously, i.e. such

MOLTEN SALT SYNTHESIS OF BARIUM AND/OR STRONTIUM TITANATE POWDER

The present invention relates to the preparation of small crystallite size barium and/or strontium titanate powder.

Conventionally, barium or strontium titanate powder is prepared by the high temperature solid state reaction of appropriate precursor compounds. The reaction product is in the form of relatively large, strong self-bonded particle aggregates which must be comminuted to the desired approximately 1.0 micron particle size before fabrication into ceramic articles.

One of the inadequacies of this conventional procedure is that the product, in commercial practice, is not fully reacted to yield uniform stoichiometry on a microscopic level. In cases where the physicochemical properties depend on the composition and its uniformity, the nonuniform composition of the conventional product can lead to less than optimum properties. Although procedures can be adopted in the conventional process to minimize these variations, the penalty in additional effort can be considerable.

The comminution portion of the conventional process is also potentially detrimental in that significant, uncontrollable quantities of undesirable impurities can be introduced from the grinding media. Again, extraordinary precautions can be taken to minimize the comminution effects, but with attendant penalties.

The present invention circumvents the inadequacies of the conventional process by substituting for the solid state reaction, a liquid phase reaction scheme utilizing a molten salt solvent with subsequent precipitation of the product which does not require comminution. In the present process, the reactants are slightly soluble in the molten salt solvent, therefore allowing literally atomic mixing in the liquid phase of the reactants. The solubilities of the reactants are such that they exceed the corresponding solubilities determined by the solubility product of the product in the molten salt solvent. Hence, the reaction product precipitates spontaneously from the molten salt solution. The reactants will continually dissolve to maintain a reactant-saturated solution until they are totally consumed by product formation.

Preferably, the reaction temperature in the present process is that required to attain reasonable reaction rates in the molten salt solvent, but it can be significantly lower than in the corresponding conventional solid state synthesis. Similarly, the reaction time can be as short as about 30 minutes or shorter compared with several hours for solid state reaction.

Briefly stated, the present process for producing alkaline earth titanate powder consists essentially of providing particulate titanium oxide in at least stoichiometric amount or particulate precursor therefor, providing particulate alkaline earth oxide in at least stoichiometric amount selected from the group consisting of barium oxide, strontium oxide, and mixtures thereof or particulate precursor therefor, providing an alkali chloride salt selected from the group consisting of sodium chloride, potassium chloride and mixtures thereof, forming a mixture of said titanium oxide or precursor therefor, said alkaline earth oxide or precursor therefor and said chloride salt solvent, heating said mixture to a reaction temperature at least sufficient to melt said chloride salt but lower than the temperature at which said alkaline earth titanate melts, said chloride salt in molten form being a solvent for said titanium oxide and said alkaline earth oxide, each said precursor decomposing completely at or below said reaction temperature to form said oxide and by-product gas, maintaining said reaction temperature dissolving and reacting said titanium oxide and said alkaline earth oxide in said molten salt and precipitating the alkaline earth titanate and recovering said precipitated alkaline earth titanate.

The reactions for producing the present alkaline earth titanates are as follows:

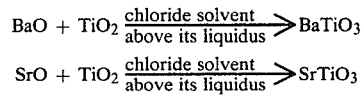

$$BaO + TiO_2 \xrightarrow[\text{above its liquidus}]{\text{chloride solvent}} BaTiO_3$$

$$SrO + TiO_2 \xrightarrow[\text{above its liquidus}]{\text{chloride solvent}} SrTiO_3$$

All of the reactants are used in at least stoichiometric amounts to achieve complete reaction. Amounts of BaO and/or SrO in excess of stoichiometric results in the introduction of a secondary phase in the product, i.e. $Ba_3Ti_2O_7$ and $Sr_3Ti_2O_7$. Generally, the amount of this secondary phase increases with increasing excess amounts of the oxides of barium and strontium.

The present process produces alkaline earth titanate. Since the crystals of alkaline earth titanate are produced by precipitation from a saturated solution, they are chemically homogeneous, i.e. they are of uniform composition on a microscopic level. Also, since the individual crystals range up to about 1 micron in size and are generally submicron, they do not require any crushing or grinding operations with their attendant contamination with impurities from the equipment employed before they can be fabricated into useful ceramic articles. Also, the crystals are roughly spherical, i.e. they lack sharp edges and corners, appearing as truncated cubes.

In carrying out the present process, the reactants or precursors therefor can be of commercial or technical grade, and their particular purity depends largely on the particular application of the resulting alkaline earth titanate. Specifically, the reactant oxides should not contain any impurities which would have a significantly deleterious effect on the resulting alkaline earth titanate powder or on its particular application.

The reactant oxides or precursors therefor should be of a size which allows the reaction to take place. Generally, these reactants or precursors therefor are used and are satisfactory in the particle size range in which they are available commercially, which ordinarily ranges from submicron up to about 100 microns. The reactant powders should also be free of large, hard aggregates, i.e. significantly above 100 microns in size, which might survive the mixing process and prevent sufficient reactant contact for satisfactory reaction rates.

In the present process the chloride salt is selected from the group consisting of sodium chloride, potassium chloride and mixtures thereof. The chloride salt solvent is used in a minimum amount of at least about 20% by weight of the total amount of reactant oxides and chloride salt solvent, and typically about 50% by weight. Amounts of chloride salt lower than about 20% by weight are not practical since the desired reaction will not proceed. There is no upper critical maximum amount of chloride salt, but amounts of chloride salt higher than about 80% by weight of the total amount of reactant oxides and chloride salt solvent provide no significant advantage. As the amount of chloride salt or salt mixture is increased from 20% by weight to about 50% by weight, the amount of individual grains or bonding is believed to be caused by Van der Waal's forces or by self-bonding, i.e. neck growth between grains. The individual grains range up to about 1 micron in size and usually are submicron. The aggregates are friable and are readily broken down with very gentle comminution during subsequent pressing into a green body.

The present alkaline earth powder can be prepared free of impurities or free of significant impurities. Therefore, when the same procedure is used, its properties are reproducible from batch to batch.

The invention is further illustrated by the following examples:

EXAMPLE 1

4.231 grams of reagent grade $BaCO_3$ ranging in size up to about 100 microns, 1.713 grams of reagent grade $TiO_2$ ranging in size up to about 100 microns, 19.773 grams of NaCl and 25.227 grams of KCl were dry mixed by tumbling in a plastic jar at room temperature for several hours.

The resulting particulate mixture was placed in a platinum vessel and loosely covered with a platinum cover to prevent introduction of impurities and placed in an air furnace preheated to the reaction temperature of 1273K(1000° C.). After 3 hours at 1273K(1000° C.), the vessel was removed from the furnace and allowed to cool to room temperature.

The reacted product was brick-like in texture and hardness. It was placed in about 4.2 liters of distilled water in a plastic vessel provided with a motor driven plastic coated stainless steel stirrer. After ~10 minutes of stirring, the brick-like cake product disintegrated completely producing a slurry of a fine powder that contained no visually perceptible aggregated material.

An aqueous flocculating solution comprised of 0.02 gram of anionic flocculant (a polyamide imide powder sold under the trademark Hercofloc 821) in 20 grams of distilled water was then added to the stirred slurry. The powder was allowed to settle and the supernatant was then decanted.

The resulting barium titanate powder was then washed with distilled water, flocculated with the aqueous flocculating solution and the supernatant decanted, and this step was done ten times. The resulting wet powder was dried by heating in air at 423K(150° C.). The dried barium titanate powder was then heated in air at about 773K(500° C.) for about 3 hours to remove any remaining water and flocculant.

About 5.0 grams of barium titanate powder were recovered. The powder was off-white in color, free-flowing and did not have any perceptible aggregates, i.e. perceptible to the eye.

X-ray diffraction analysis of the powder showed no phase other than $BaTiO_3$.

EXAMPLE 2

In a steel die under 10,000 psi, two discs were pressed from the powder prepared in Example 1, and two other discs were pressed from a commercial $BaTiO_3$ powder. The discs had about the same density and each disc was about 0.5" in diameter and 0.060" in thickness. Each disc was sintered for four hours at the indicated temperature in Table I on a platinum substrate in an air atmosphere. The results are shown in Table I.

Table I

| Sintering Temp. (°C.) | Density | |
|---|---|---|
| | Example 1 Product | Commercial $BaTiO_3$ |
| | ($gcm^{-3}$) | |
| 1300 | 5.8 | 5.4 |
| 1400 | 5.71 | 5.55 |

The density of $BaTiO_3$ is 6.1 $g/cm^3$. As illustrated by Table I, the sintered discs produced from the powder prepared in Example 1 had a density significantly higher than the sintered discs produced from the commercial $BaTiO_3$.

Sintered products of $BaTiO_3$ are useful as dielectric materials for electrical circuit capacitors.

EXAMPLE 3

Three equal aliquots, each containing 884.88 grams of reagent grade $SrCO_3$ (10 wt. % in excess of stoichiometric) ranging in size up to about 100 microns, 435.37 grams of reagent grade $TiO_2$ ranging in size up to about 100 microns, 439.40 grams of NaCl and 560.60 grams of KCl were stirred vigorously with about two liters of distilled water forming a slurry which was then placed in plastic labware and dried in an air oven at ~200° C. Each dried mixture was comminuted lightly in mortar and pestle, and the three mixtures were then combined and homogenized.

The resulting homogenized dried mixture was placed in $\alpha$-$Al_2O_3$ vessels and covered loosely with $\alpha$-$Al_2O_3$ covers to prevent introduction of impurities and placed in an air furnace at room temperature. The furnace was heated at a rate of about 100° C. per hour to the reaction temperature of 1223K(950° C.), where it was held for 15 minutes, and then heated at a rate of 20° per hour to the reaction temperature of 1273K(1000° C.), where it was held for one hour. The power to the furnace was then shut off, and the product was furnace-cooled to room temperature at the rate of about 150° C. per hour.

The reacted product was brick-like in texture and hardness. Each of two equal aliquots was placed in about 24 liters of distilled water in a plastic vessel provided with a motor driven plastic coated stainless steel stirrer. After ~10 minutes of stirring, the brick-like cake product disintegrated completely producing a slurry of a fine powder that contained no visually perceptible aggregated material.

An aqueous flocculating solution comprised of 0.02 gram of anionic flocculant (a polyamide imide powder sold under the trademark Hercofloc 821) in 20 grams of distilled water was then added to the stirred slurry. The powder was allowed to settle and the supernatant was then decanted.

The resulting strontium titanate powder was then washed with distilled water, flocculated with the aqueous flocculating solution and the supernatant decanted, and this procedure was done ten times. The resulting wet powder was dried by heating in air at 423K(150° C.). The dried strontium titanate powder was then heated in air at about 773K(500° C.) for about 3 hours to remove any remaining water and flocculant.

About 3000 grams of strontium titanate powder were recovered. The powder was off-white in color, free-flowing and did not have any perceptible aggregates, i.e. perceptible to the eye.

X-ray diffraction analysis of the powder showed it to be composed of SrTiO$_3$ and a trace of Sr$_3$Ti$_2$O$_7$.

B.E.T. measurement of the product powder showed it to have a surface area of 3.00 meters$^2$ gram$^{-1}$ and a spherical equivalent crystal size ≅0.39 micron.

EXAMPLE 4

20.21 grams of reagent grade SrCO$_3$ (0.5 weight % in excess of stoichiometric) and ranging in size up to about 100 microns were dispersed in 200 ml distilled water. 17.2 ml of concentrated HNO$_3$ were added slowly to the dispersed SrCO$_3$ to prepare a Sr(NO$_3$)$_2$ solution. To the resulting solution, 10.89 grams of reagent grade TiO$_2$ ranging in size up to about 100 microns, 10.99 grams of NaCl and 14.01 grams of KCl were added and vigorously mixed. The mixture was then placed in plastic labware and dried in air at about 200° C.

The resulting dried mixture was placed in an α-Al$_2$O$_3$ crucible and covered loosely with an α-Al$_2$O$_3$ cover to prevent introduction of impurities, and placed in an air furnace at room temperature and heated at a rate of about 100° C. per hour to the reaction temperature of 1013K(740° C.), where it was held for two hours. The power to the furnace was then shut off, and the product was furnace cooled to room temperature.

The reaction product was retrieved in substantially the same manner as set forth in Example 3.

About 25 grams of strontium titanate powder was recovered. The powder was off-white in color, free-flowing and did not have any perceptible aggregates.

X-ray diffraction analysis of the powder showed no phase other than SrTiO$_3$.

The present strontium titanate powder can be pressed into green bodies of desired size and shape and fired at temperatures below its melting point in an oxygen-containing atmosphere such as air to produce fired polycrystalline bodies with densities of at least about 85% of theoretical density and useful, for example, as dielectric materials for capacitors and electrical circuits.

The following copending U.S. patent applications are assigned to the assignee hereof and are incorporated herein by reference:

Ser. No. 8734 filed Feb. 2, 1979 in the names of R. H. Arendt and M. J. Curran entitled "Molten Salt Synthesis of Lithium Meta-Aluminate Powder" discloses a process consisting essentially of forming a mixture of an alkali chloride solvent salt, a lithium salt reactant selected from the group consisting of lithium hydroxide, lithium nitrate, lithium carbonate and mixtures thereof, and an aluminum salt reactant selected from the group consisting of aluminum hydroxide, alpha-alumina, gamma alumina and mixtures thereof and heating said mixture to melt the chloride salt solvent in which the lithium and aluminum salt reactants dissolve and react precipitating lithium meta-aluminate.

Ser. No. 10,747 filed Feb. 9, 1979 in the names of R. H. Arendt and M. J. Curran entitlted "Magnesium Aluminum Spinel" discloses a process consisting essentially of forming a mixture of magnesium oxide, aluminum oxide and an alkali chloride salt solvent and heating said mixture to melt the chloride salt solvent in which the magnesium oxide and aluminum oxide dissolve and react precipitating magnesium aluminate.

Ser. No. 11,100 filed Feb. 12, 1979 in the names of R. H. Arendt and M. J. Curran entitled "magnesium Chrome Spinel" discloses a process which consists essentially of forming a mixture of magnesium oxide, chromium oxide and an alkali chloride salt solvent and heating said mixture to melt the chloride salt solvent in which the magnesium oxide and chromium oxide dissolve and react precipitating magnesium chromite.

Ser. No. 85,921 filed of even date herewith in the names of R. H. Arendt and J. H. Rosolowski entitlted "Molten Salt Synthesis of Orthorhombic Lead Metaniobate Powder" discloses a process consisting essentially of forming a mixture of lead oxide, niobium pentoxide and an alkali chloride salt solvent and heating said mixture to melt the chloride salt solvent in which the lead oxide and niobium pentoxide dissolve and react precipitating orthorhombic lead metaniobate.

Ser. No. 85,912 filed of even date herewith in the names of R. H. Arendt and J. H. Rosolowski entitled "Molten Salt Synthesis of Modified Alkali Niobate Powders" discloses a process consisting essentially of forming a mixture of niobium pentoxide, an oxide of sodium, potassium, or mixtures thereof, an oxide of lead, cadmium or mixtures thereof, and an alkali chloride salt solvent, and heating said mixture to melt the chloride salt solvent in which all of the oxides dissolve and react precipitating modified alkali niobate.

Ser. No. 85,911 filed of even date herewith in the names of R. H. Arendt and J. H. Rosolowski entitled "Molten Salt Synthesis of Alkali Niobate Powders" discloses a process consisting essentially of forming a mixture of niobium pentoxide, an oxide of an alkali selected from the group consisting of sodium, potassium, lithium and mixtures thereof, and an alkali chloride salt solvent, and heating said mixture to melt the chloride salt solvent in which the niobium oxide and alkali oxide dissolve and react precipitating the alkali niobate.

What is claimed is:

1. A process for producing alkaline earth titanate powder which consists essentially of providing particulate TiO$_2$ in at least stoichiometric amount or particulate precursor therefor, providing particulate alkaline earth oxide in at least stoichiometric amount or particulate precursor therefor, said alkaline earth oxide being selected from the group consisting of BaO, SrO, and mixtures thereof, providing an alkali chloride salt selected from the group consisting of sodium chloride, potassium chloride and mixtures thereof, forming a mixture of said TiO$_2$ or precursor therefor, said alkaline earth oxide or precursor therefor and said chloride salt solvent, said chloride salt being used in an amount of at least about 20% by weight of the total amount of said TiO$_2$, alkaline earth oxide and said chloride salt, heating said mixture to a reaction temperature at least sufficient to melt said chloride salt, each said precursor decomposing completely at or below said reaction temperature to form said oxide and by-product gas, said chloride salt in molten form being a solvent for said TiO$_2$ and alkaline earth oxide, maintaining said reaction temperature dissolving and reacting said TiO$_2$ and alkaline earth oxide in said molten salt and precipitating said alkaline earth titanate, and recovering said precipitated alkaline earth titanate by dissolving said chloride salt and separating said precipitated alkaline earth titanate from the resulting salt solution.

2. The process according to claim 1 wherein said alkaline earth oxide is BaO.

3. The process according to claim 1 wherein said alkaline earth oxide is SrO.

4. The process according to claim 1 wherein said alkaline earth oxide is in stoichiometric amount.

5. The process according to claim 1 wherein said TiO$_2$ and alkaline earth oxide or precursors therefor range in particulate size from submicron up to about 100 microns.

6. The process according to claim 1 wherein said chloride salt is a mixture comprised of 50 mole % sodium chloride and 50 mole % potassium chloride and said reaction temperature is a minimum of about 658° C.

* * * * *